United States Patent Office 2,940,028
Patented June 7, 1960

2,940,028

SELF-DAMPING SERVO MOTOR

Benjamin Parzen, Woodside, N.Y., assignor, by mesne assignments, to The Siegler Corporation, Long Island City, N.Y., a corporation of Delaware Filed Nov. 14, 1956, Ser. No. 622,051

10 Claims. (Cl. 318—211)

The present invention relates to position signal indicating devices for phase meters and the like, and particularly to such devices having both a rapid response to large signal changes and a high degree of stability.

It is often desired to measure a varying phase difference between two alternating current signals and to present the varying result as a position signal. Usually, it is desired that the position indicator have an angular displacement equal to the phase angle between the two signals.

The present invention may be used for example in radio direction finding systems to compare the phase of a received signal from a rotating antenna with a reference signal developed by the rotation of the antenna. In this manner the angle subtended by the radio transmitter with respect to a reference plane is thus measured and presented by a position signal indicator. Such an application of an indicator phase meter to radio direction finding systems is described in my copending patent application No. 440,431, filed June 30, 1954, now Patent No. 2,800,655, issued July 23, 1957.

It is desirable in a position indicator type device of the nature described herein that the indicating means respond rapidly to sudden large changes in signal. At the same time it is desired that small rapid fluctuations in the signal do not induce a fluctuation or jitter in the indicating means. It may be clearly seen that these two requirements are to some extent contradictory and that good performance in one respect will normally require a sacrifice of performance in the other. The present invention is designed to provide a maximum degree of performance in both of the above respects and to accomplish this purpose with a device of great simplicity and reliability.

It is therefore an object of the present invention to provide a stabilized position indicator phase meter having a rapid response for large phase changes and a high stability in the presence of small rapid fluctuations in the phase difference signal.

It is another object of the present invention to provide a stabilized indicator phase meter wherein large error signals are rapidly reduced to zero but in which error signals smaller than a predetermined value are corrected at a slow rate of response.

It is still another object of the invention to provide a stabilized indicator phase meter having an error signal sensing circuit for changing the response of the error-correcting circuit to a rapid response condition for error signals greater than a predetermined magnitude.

It is a further object of the present invention to provide a shunt or by pass circuit in a stabilized indicator phase meter which normally shunts or short-circuits high frequency error signals but which is disconnected when the error signal exceeds a predetermined magnitude.

It is a further object of the present invention to provide a servomotor having an integral damping arrangement to induce a resistance to high velocities of the servomotor without materially decreasing the stall torque of the motor.

It is a still further object of the present invention to provide such a servomotor in which the damping arrangement may be rendered inoperative or less effective at will.

It is a still further object of the present invention to provide a servomotor wherein two control windings are arranged so that their electro-motive effect is partially subtractive and their damping effect is partially additive, so that a self-damping servomotor is provided.

Further objects and advantages will appear from a consideration of the following description in conjunction with the appended drawings in which.

Figure 1:
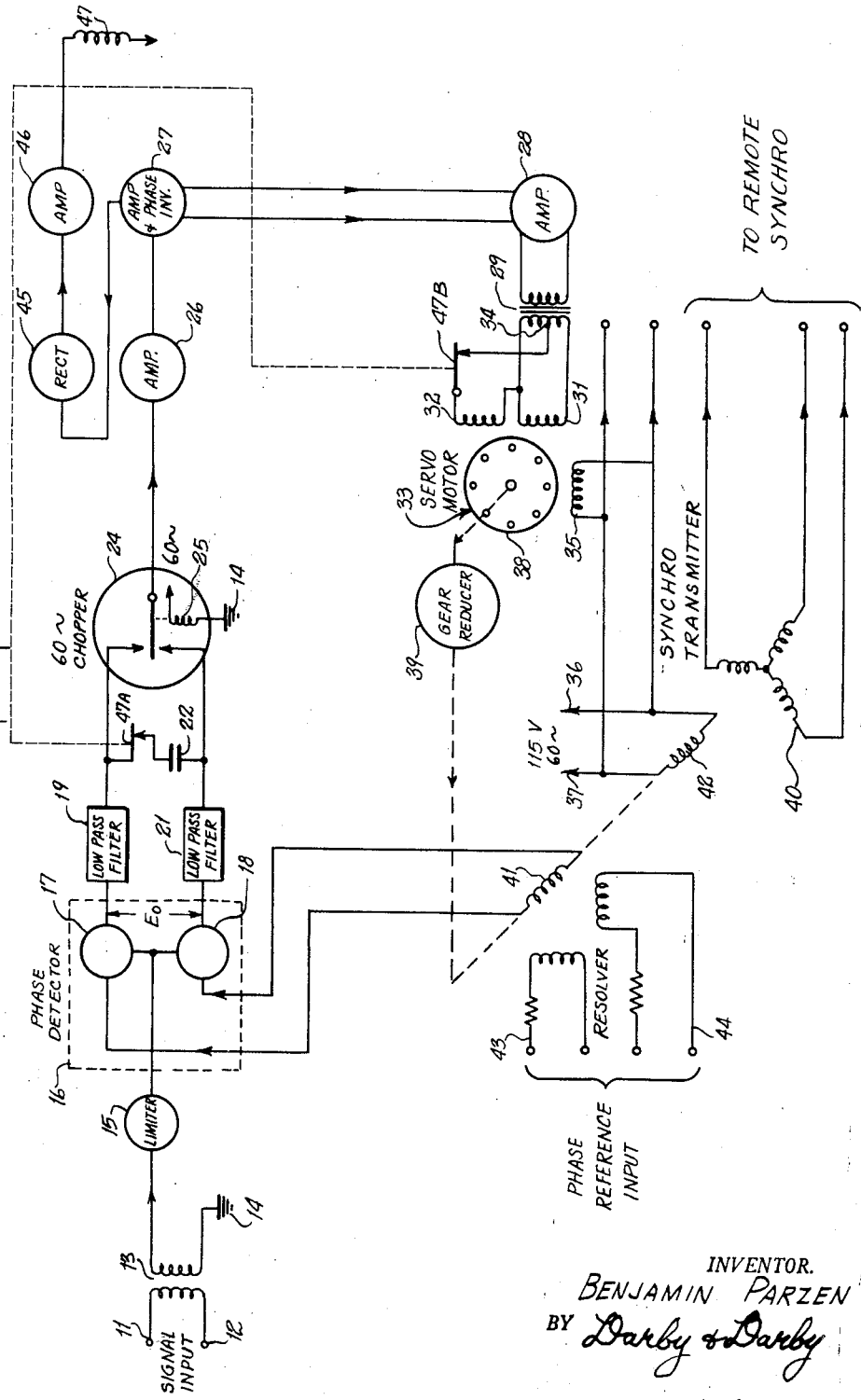
Figure 1 is a schematic circuit diagram of a stabilized position indicator phase meter according to the present invention.

Referring now to Figure 1, a pair of signal input terminals 11 and 12 are provided to receive the signal of unknown phase. The signal of unknown phase may be derived from a rotating radio antenna for example as is shown in my previously mentioned copending patent application No. 440,431. The input signal is fed through an input transformer 13 to a limiter stage 15. One terminal of the input transformer secondary is connected to ground 14. The limiter 15 serves to eliminate fluctuations in the amplitude of the input signal which are of course undesirable in a circuit in which only the relative phase of the input signal is to be determined. Of course where the input signal is not of a fluctuating nature, no limiter stage would be required.

The limited signal is fed from the limiter 15 to the phase detector 16 which also is supplied with a reference signal having a known phase as will later be described. Balanced detector stages 17 and 18 produce an input voltage $E_0$ which varies in sign and magnitude according to the phase difference between the signal input and the phase reference signal. The output of the phase detector stage is not necessarily linearly proportional to the phase difference of the detector input signals.

Many different circuits may be utilized to accomplish this phase detection function but it is preferred that a circuit of the type shown in my previously mentioned copending application be used for this purpose. The circuit in my copending application has particular advantages with regard to the elimination of signals of unwanted frequency and other advantages which are fully described and explained therein.

The output of the phase detector is fed through low pass filters 19 and 21 to eliminate high frequency fluctuations in the signal. It is obvious that filtering of signals of higher frequency will cause an increase in the response time of the device and conversely failure to filter the high frequency signals will tend to cause a rapid fluctuation or jitter in the indicating means. The low pass filters are therefore designed to strike a reasonable compromise suitable for the particular application of the device.

An additional filter means is provided by a capacitor 22 connected in series with the contacts 47A of a relay 47. The series combination is connected across the phase detector output so that a low impedance path for high frequency signals is provided when the contacts of the relay are closed. Thus with the relay in its normally closed position the fluctuations in the system are reduced at the expense of a slight increase in response time. However, the response time may be reduced by actuating the relay and opening the shunt circuit.

The signal which is not filtered by the low pass filters or the capacitor 22 is fed to a 60 cycle chopper 24. The coil 25 of the chopper is connected to a 60 cycle source, so that the D.C. signal received by the chopper is converted to an alternating current signal having a frequency of 60 cycles and a magnitude proportional to the D.C. signal.

The A.C. signal is fed to an amplifier 26 which amplifies the signals and which may also filter the signal to eliminate frequencies other than 60 cycles. A second amplifier 27 is provided to further amplify the A.C. signal and also to provide a phase inversion. The inverted signal is then fed to the power amplifier 28 which further amplifies the signals to provide the signal to control a servometer as will be later explained.

Amplifiers 26, 27 and 28 may be constructed in any one of many known manners and of course a fewer or a greater number of amplifiers might be used to provide the necessary amplification. The output of the final amplifiers 28 is fed to a transformer 29 which is connected to control windings 31 and 32 of a servomotor. One or more of the amplifiers shifts the phase of the control signal so that the proper phase relation between the control and power windings of the servomotor is attained.

A control winding 31 is connected across the entire secondary of the transformer 29, a second control winding 32 is connected between the center tap 34 and an end terminal of the secondary of the transformer 29. A set of contacts 47B of the relay 47 are connected in series in the circuit of the second control winding 32. It should be noted that the second control winding 32 is connected in opposite polarity to the first control winding 31 and thus the flux in the second control winding opposes the flux in the first control winding.

The two windings 31 and 32 are in zero space phase and in fact may be provided by splitting a single winding in a two phase motor into two parts. The number of turns in the respective windings may or may not be equal. It will be observed that although the flux created by each of the two windings is in opposition, a resultant flux is created due to the fact that the winding 32 is connected across only a part of the secondary of the transformer 29. This unbalanced condition of the flux in the two windings 31 and 32 might also be provided by an inequality in the number of turns in respective windings. Also a potentiometer arrangement or other equivalent arrangement might be substituted for the transformer 29 in order to provide a different flux for each of the two control windings. A power winding for the servomotor is shown at 35. The power winding is connected through leads 36 and 37 to a 60 cycle source which may be the usual 115 volt, 60 cycle power supply. An induction type squirrel cage armature 38 is provided for the servomotor.

Except for the provision for two control windings 31 and 32 connected in the particular manner, the servomotor arrangement shown may be of the normal type in which a two phase induction motor has the windings associated with one phase connected to a constant voltage power supply and the windings of a second phase connected to receive a control signal. Thus the servomotor is not driven by the current in the power windings in the absence of a control signal in the control windings due to the fact that no rotating electrical field is produced. However, when a control current of proper phase is provided in the control windings the power supplied to the servomotor is much greater than the power consumed from the control windings and thus a large amount of power can be controlled by a relatively small control signal.

The purpose of the dual control windings described above is to provide rate damping for the servomotor without the necessity for external circuitry. The common method of providing rate damping is to utilize a tachometer to sense the servomotor velocity, an amplifier to amplify the tachometer output and means whereby the tachometer amplifier output is applied to retard or counteract the velocity of the servomotor. It is obvious that such an arrangement requires a considerable amount of additional circuitry which increases the cost of the system and reduces its reliability.

From the description of the two control windings and the manner in which they are connected, it may be seen that a control signal introduced into transformer 29 will cause a resultant flux in the control phase which will cause a rotation of the servomotor armature in much the same manner as in a conventional servomotor. In some cases the flux may be appreciably reduced as a result of the method of connecting the windings, but in such a case suitable adjustments could be made to compensate for any reduction of power. Although current flowing from the transformer 29 into the winding 32 tends to produce an effect counteracting the effect of the current in the control winding 31, it is the principal feature of the connection of the coils shown in Figure 1 that the back voltage induced in windings 31 and 32 produces induced currents which tend to add in the winding network connected as shown in Figure 1.

It is well known that the back voltage induced in the windings of such a motor causes a current to flow which in turn produces a flux that tends to retard or brake the armature motion. In other words, a motor may also act as a generator and if a circuit is provided so that a high current flows in the motor windings the rotation of the motor armature (now acting as a generator) will be greatly retarded or damped as a result of the current generated in the field coils. Thus the present circuit is connected so that the induced currents in the two control windings are additive and hence a large induced current is produced in the windings so that a considerable rate damping effect is produced in the servomotor.

In order that this important additive effect be produced, it is necessary that the output impedance of the amplifier 28 be relatively high so that the impedance looking into the transformer 29 from the control windings 31 and 32 is high compared with impedance of the windings themselves. When this is the case it will be seen that a large portion of the current in winding 32 will pass through half of the transformer secondary and through the winding 31 and that this current will be in such a direction that the damping effect of windings 31 and 32 will be at least partially additive.

From the foregoing explanation it may be seen that when the contacts 47B are closed, windings 31 and 32 produce electro-motion effects which are subtractive, but produce rate damping effects which are additive and hence a servomotor is provided which has an integral rate damping arrangement.

The inclusion of the relay contacts 47B in the circuit of the control winding 32 allows the control winding 32 to be disconnected by actuation of the relay 47. When the contacts 47B are opened and the winding 32 is thus disconnected the servomotor control winding 31 is then connected in the customary manner so that no rate damping is produced in the servomotor. The servomotor may thus be operated in either one of two conditions, damped or undamped according to the position of the contacts 47B.

The novel arrangement of the servomotor windings to provide an integral damping effect is a primary feature of the invention. It will be obvious that the self-damping servomotor may be used in many other applications and it is not intended that the use of such a servomotor be construed to be limited to a phase indicator alone.

Armature 38 of the servomotor is mechanically connected through a gear reducer 39 to the rotor 41 of a resolver. The gear reducer 39 reduces the output velocity of the servomotor by a factor of 60, for instance, in order to provide a response speed commensurate with the system requirements and with the other components of the system. The servomotor armature is also connected through the gear reducer 39 to the rotor 42 of a synchro transmitter. The synchro transmitter 40 is connected by suitable means to a remote indicator to provide a position indicator output signal corresponding to the resolver rotor position and hence to the phase difference between the input signal and the phase reference signal.

The resolver rotor 41 is associated with two resolver windings 43 and 44 which are supplied with the phase reference signals in 90° phase relation. The signal in the resolving rotor therefore has a phase determined by the physical position of the rotor. If the physical position of the rotor 41 is such that there is a phase difference between the signal from the rotor 41 and the input signal introduced at terminals 11 and 12, then an error signal is produced in the phase detector 16 which passes through the circuit in the manner previously described and causes a rotation of the servomotor which continues to drive the rotor 41 of the resolver until the difference between the phase of the signal in the rotor 41 and that from the input terminals 11 and 12 is reduced to zero. The system therefore constantly tends to maintain the rotor position 41 at an angle equal to the phase difference between the phase reference signal and the signal input. This angle is detected by the synchro transmitter and transmitted to the remote indicator so that a position signal is provided at the remote indicator equal to the phase difference between the two signals.

The output of the amplifier 27, which is proportional (though not necessarily linearly proportional) to the magnitude of the phase error signal, is fed through a rectifier 45 to an amplifier 46. The output of the amplifier operates a relay 47. The contacts of the relay 47 are shown at 47A and 47B as has been previously described. When the error signal produced by the phase detector is small, the output of the amplifier 46 will be insufficient to actuate relay 47 and the contacts 47A and 47B will be in their normally closed position as shown. It has been previously explained that the capacitor 22 tends to increase the stability of the system at the expense of rapidity of response when the contact 47A is closed. In addition the winding 32 produces a damping effect on the servomotor when the contact 47B is closed. This damping effect tends to increase the response time but also increases the stability and reduces overshoot.

When a relatively large error signal is produced by the phase detector, it is desired that such error be reduced rapidly. The relay 47 accomplishes this result by opening the contacts 47A and 47B when an error signal above a predetermined value is produced by the phase detector 16. Opening the contacts decreases the response time by eliminating the effect of the capacitor 22 and the damping winding 32. The relay and associated circuitry could obviously be replaced by one or more electron tubes or other equivalent devices to perform the automatic switching function.

Figure 2:
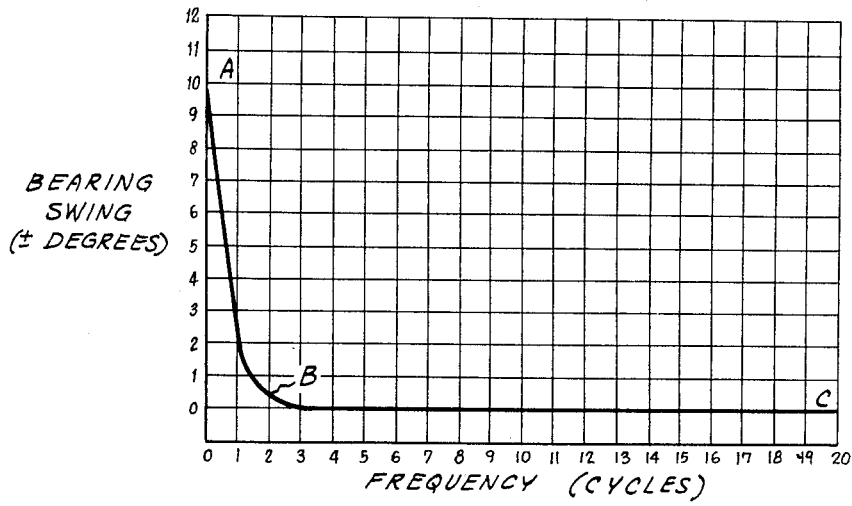
Figure 2 is a graph showing the frequency response curve of the device shown in Figure 1.
Figure 3:
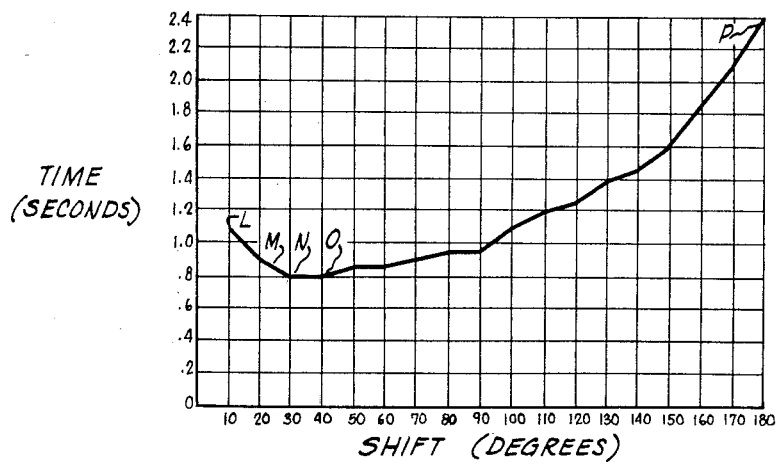
Figure 3 is a graph of the total response time for instantaneous phase shifts of the device shown in Figure 1.

The effect of this dual condition arrangement is demonstrated in Figures 2 and 3. Figures 2 and 3 show the response of a circuit such as that shown in Figure 1 where the relay 47 is adjusted to be actuated when the phase error exceeds 15 degrees.

Figure 2 shows the response at the indicator, that is, bearing swing, when a cyclic phase variation having a magnitude of plus or minus 10 degrees is introduced at the input 11 and 12. The abscissa of the graph in Figure 2 represents the frequency of the cyclic phase shift introduced at the input 11 and 12.

Thus, it may be seen that the combined damping effects of the capacitor 22 and the damping winding 2 virtually eliminate any fluctuation in the output for phase variations having a frequency of three or more cycles per second. For a frequency of two cycles per second the bearing swing at the indicator is less than one degree while at one cycle per second the bearing swing is about three degrees.

In order to accomplish this high degree of stability, it would normally be necessary to sacrifice the response time of the device. Figure 3 shows a total response time for varying magnitudes of instantaneous shift in phase at the input 11 and 12. The point L indicates that an instantaneous shift of ten degrees requires slightly more than one second for response. It should be noted that the instantaneous shift of ten degrees will not produce an error signal of sufficient magnitude to actuate the relay (set for 15 degrees) and hence the correction for a 10-degree shift will be made entirely at the slow response rate.

The point M indicates that a shift of 20 degrees requires a response time of somewhat less than one second, less than that required for a smaller 10-degree shift. This apparently anomalous situation is readily explained by the fact that the 20-degree shift actuates the relay, opening the circuit of the capacitor 22 and the damping winding 32 so that the device is placed in the rapid response condition. As would normally be expected, the release point for the relay 47 is somewhat less than the actuation point, i.e. 15 degrees, so that the part of the correction below 15 degrees is made at the high response rate as well as the part of the correction between 15 and 20 degrees.

At some point before the phase error is reduced to zero, however, the relay 47 will release and the capacitor 22 and the damping winding 32 will be actuated in the system. The damping winding will then serve to sharply reduce the velocity of the servomotor armature 38 so that overshoot of the indicator is greatly reduced. The response time graph of Figure 3 presents total time required for stabilized indication including the time required for recovery from overshoot. It will be noted in Figure 3 that the total response time for phase shifts up to 90 degrees is less than the 10-degree shift time due to the operation of the relay 47, and that even a 179-degree phase shift requires a response time of only 2.4 seconds.

Although a particular embodiment of the present invention has been shown and described, it should be understood that many modifications could be made by a person of ordinary skill in the art within the scope of the present invention. The scope of the invention is therefore not to be construed as limited to the embodiment shown, but rather is to be limited solely by the appended claims.

What is claimed is:

1. A self-damping electric motor comprising an armature, a plurality of field poles, first windings for said field poles, second windings for at least two of said field poles, means for electrically connecting each said first and second winding to a current source, each said second winding being connected in opposite polarity with its respective first winding as respects driving voltage and in the same polarity as respects counter electromotive force, whereby the velocity damping effect of said dual windings is at least partially additive and the electro-motion effect is at least partially subtractive.

2. A self-damping electric motor as claimed in claim 1 characterized in that said motor is an alternating current induction type motor and further characterized in that said armature is a squirrel-cage type armature.

3. A self-damping electric motor as claimed in claim 1 characterized in that said second windings produce less flux than said first winding.

4. A self-damping electric motor as claimed in claim 1 characterized in that said second field windings have a number of turns unequal to that of said first field windings.

5. A self-damping electric motor as claimed in claim 1 characterized in that second field windings are connected to receive a lesser amount of current than said first field windings.

6. A self-damping induction type alternating current motor comprising a squirrel-cage armature, a power field winding adapted to be connected to an alternating current power source, a first control field winding displaced 90 degrees in space phase from said power winding, a second control field winding in zero space angle with said first control winding, means for electrically connecting each said control winding to an alternating current signal source, said second control windings being connected in opposite phase relationship with said first control windings as respects driving voltage and in the same phase relationship as respects counter electromotive force whereby the velocity damping effect of said control windings is at least additive and the electro-motion effect is at least partially subtractive.

7. A self-damping motor as claimed in claim 6 characterized in that said second control windings have a number of turns unequal to that of said first control windings.

8. A self-damping induction type electric motor as claimed in claim 6 characterized in that said second control windings are connected to receive a lesser amount of current than said first control windings.

9. A self-damping induction type electric motor as claimed in claim 6 characterized in that said motor further includes a switch for interrupting the electrical circuit of said first control winding whereby the damping effect of said winding may be eliminated.

10. A self-damping electric motor comprising an armature, a plurality of field poles, first windings for said field poles, second windings for at least two of said field poles, a transformer having a secondary winding supplying current to said first and second motor windings, said first motor winding being connected across said transformer secondary, said second motor winding being connected in opposite polarity across a portion only of said transformer secondary whereby the driving voltage is in opposite polarity in said first and second motor windings and the counter electromotive forces introduced by the armature are in the same polarity.

References Cited in the file of this patent
UNITED STATES PATENTS

| | | |
|---|---|---|
| 854,122 | Storer | Mar. 21, 1907 |
| 2,131,607 | Wade | Sept. 27, 1938 |
| 2,413,128 | Wills | Dec. 24, 1946 |
| 2,454,968 | Fuge | Nov. 30, 1948 |
| 2,574,837 | Mouzon | Nov. 13, 1951 |
| 2,703,380 | Fraser | Mar. 1, 1955 |
| 2,729,772 | Perkins | Jan. 3, 1956 |
| 2,814,006 | Wilde | Nov. 19, 1957 |